Jan. 31, 1967 TAKUYA KAWAMOTO ETAL 3,302,032

TRANSISTOR LOGIC CIRCUIT

Filed April 6, 1962 2 Sheets-Sheet 1

Inventors
Takuya Kawamoto
Sawako Kawamoto

Hill, Sherman, Meroni, Gross & Simpson

Attorney

TRANSISTOR LOGIC CIRCUIT

Filed April 6, 1962 2 Sheets-Sheet 2

Inventors.
Takuya Kawamoto
Sawako Kawamoto

Hill, Sherman, Meroni, Gross & Simpson
Attorneys

United States Patent Office 3,302,032
Patented Jan. 31, 1967

3,302,032

TRANSISTOR LOGIC CIRCUIT

Takuya Kawamoto and Sawako Kawamoto, Tokyo, Japan, assignors to Sony Corporation, Tokyo, Japan, a corporation of Japan Filed Apr. 6, 1962, Ser. No. 185,572
Claims priority, application Japan, Apr. 8, 1961, 36/12,456
11 Claims. (Cl. 307—88.5)

This invention relates to a transistor logic circuit and more particularly to a logic circuit having elements symmetrically arranged to form a balanced four-terminal circuit.

This invention was evolved with the general object of providing a logic circuit constituting an improvement over prior circuits with respect to balancing of input and output connections, versatility, speed of response, simplicity and economy of construction, and reliability.

According to this invention, a logic circuit is provided having two transistors of the same conductive type connected in parallel to a suitable power source, with a pair of input terminals being connected to the base electrodes of the transistors and with a pair of output terminals being connected to the collectors of the transistors. With this arrangement, a symmetrical, balanced four-terminal circuit is provided. The output signal has a polarity determined by the polarity of the input signal, but the magnitude of the output signal is substantially independent of the magnitude of the input signal.

According to a specific feature of the invention, the power source may supply intermittent power, preferably in the form of regularly recurring clock pulses, to obtain conduction of the tansistors only at certain times.

Another specific feature of the invention is in the provision of means for regulating voltages applied to the transistors to insure stable and reliable operation.

In general, two different modes of operation are possible with circuits according to the invention. In one mode of operation, one transistor is rendered non-conductive while the other conducts and is held in that state so long as a voltage is applied to the power source. In the other mode, the states of conduction of the transistors may be reversed, or both may be rendered non-conductive, at any time under control of the input signal, even though a voltage is still applied from the power source.

This invention contemplates other objects, features and advantages which will become more fully apparent from the following detailed description taken in conjunction with the accompanying drawings which illustrate preferred embodiments and in which.

Figure 1:
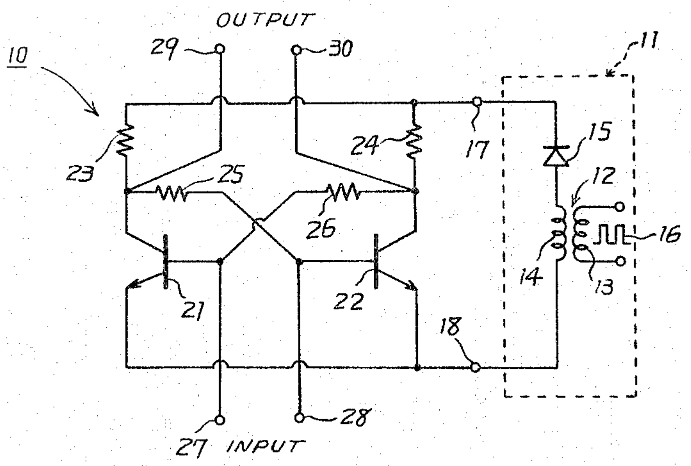
FIGURE 1 is a circuit diagram of a transistor logic circuit constructed according to this invention.

Referring to FIGURE 1, reference numeral 10 generally designates a logic circuit constructed according to the principles of this invention, operative as a majority logic circuit. The circuit 10 comprises a power source 11 including a transformer 12 having a primary winding 13 and a secondary winding 14, the secondary winding 14 being connected in series with a diode 15 to a pair of output terminals 17 and 18. A suitable signal is applied to the primary winding 13, preferably a regularly recurring clock pulse signal 16 as diagrammatically illustrated, to develop a uni-directional pulse signal across the output terminals 17 and 18. This signal may have a wave form as indicated by reference numberal 19 in FIGURE 2A.

Power source output terminal 18 is connected to the emitters of a pair of NPN type transistors 21 and 22 having collectors connected through resistors 23 and 24 to the power source output terminal 17, and also connected through resistors 25 and 26 to the base electrodes of transistors 22 and 21, respectively. A pair of signal input terminals 27 and 28 are connected to the base electrodes of transistors 21 and 22 while a pair of signal output terminals 29 and 30 are connected to the collectors of the transistors 21 and 22. The transistors 21 and 22 preferably have substantially identical characteristics and it will be appreciated that a symmetrical, balanced four-terminal circuit is thus provided.

Figures 2, 4:
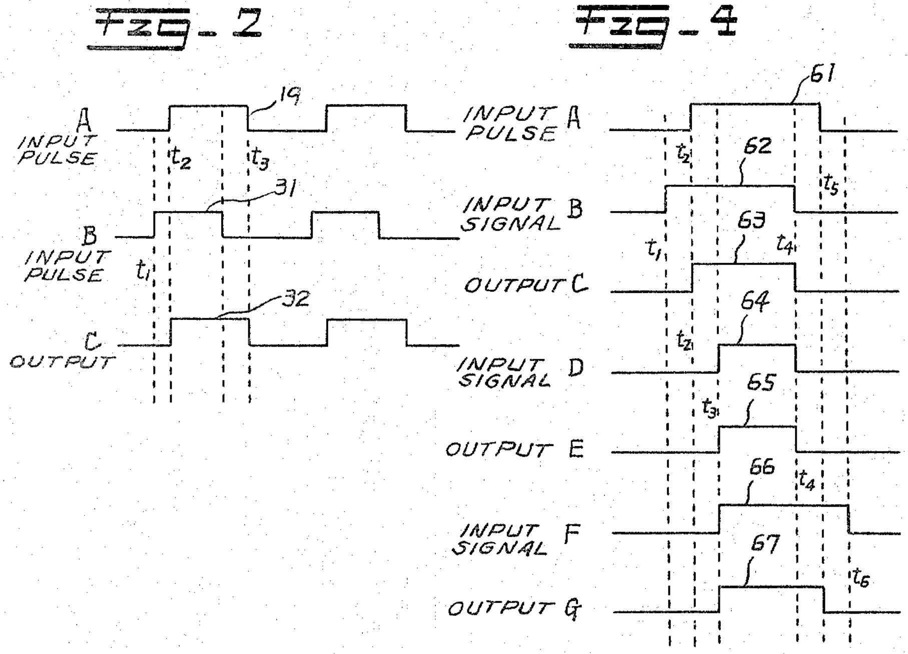
FIGURE 2 shows wave forms for explaining the operation of the circuit of FIGURE 1.
FIGURE 4 shows wave forms for explaining the operation of the circuit of FIGURE 3.

In operation, when the signal 19 shown in FIGURE 2A is applied in the absence of an input signal either a positive or a negative output signal is developed across the output terminals 29 and 30, depending upon which of the transistors 21 or 22 starts to conduct first, the circuit being unstable. However, when the signal 19 is applied in the presence of an input signal applied to terminals 27 and 28, an output signal is developed at the signal output terminals 29 and 30 having a polarity determined by the polarity of the input signal.

For example, assume that an input signal is applied having a wave form as indicated by reference numeral 31 in FIGURE 2B to place input terminal 27 at a positive potential realtive to input terminal 28 a time $t_1$, prior to a time $t_2$ at which the power source signal 19 is applied and continuing until a certain time after the time $t_2$. Under such conditions, the transistor 21 is rendered conductive at time $t_2$, while the transistor 22 is rendered non-conductive or cut-off due to the negative input signal applied to the base electrode thereof and due to the connection of the base electrode through resistor 25 to the collector of the transistor 21 which is then at a low potential due to the conduction of the transistor 21. At the same time, high conduction of transistor 21 is insured by the connection of the base electrode thereof through resistor 26 to the collector of transistor 22 which is then at a high positive potential due to non-conduction of the transistor 22.

Thus at time $t_2$, the output terminal 29 will be at a potential closely approaching that of the negative power source terminal 18, while the output terminal 30 will be at a potential closely approaching the potential of the positive power source terminal 17. Due to the cross-connection of the collector and base electrodes through resistors 25 and 26, such conduction will be maintained until a time $t_3$ at which the power source signal 19 ends. Accordingly, an output signal is generating having a wave form as indicated by reference numeral 32 in FIGURE 2C.

It will be appreciated that due to the symmetry of the circuit, a reversal of the polarity of the input signal will reverse the polarity of the output signal, the transistor 22 being rendered conductive rather than the transistor 21. Accordingly, an output signal is obtained in response to an intermittent power source signal, having a direction dependent upon that of the power source signal and having a polarity determined by that of the input signal. It is also noted that the magnitude of the output signal is substantially determined by the magnitude of the power source signal and is substantially independent of the magnitude of the input signal.

In order to constitute a "not" logic circuit, the polarity of a succeeding stage to be connected to output terminals 29 and 30 may be reversed.

Figure 3:
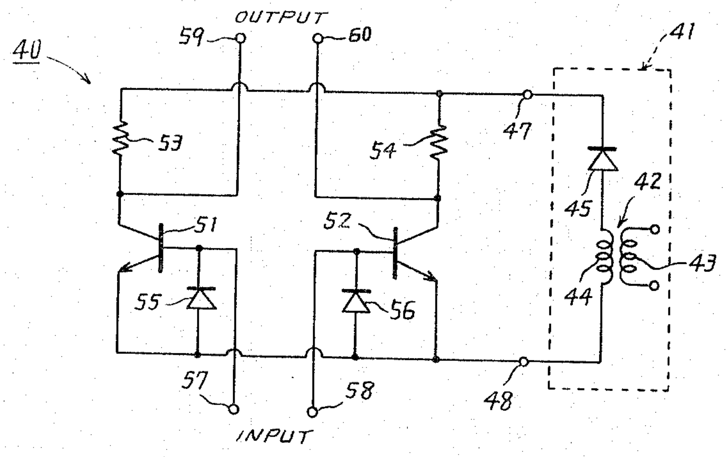
FIGURE 3 is a circuit diagram of another transistor logic circuit constructed according to this invention.

Referring now to FIGURE 3, reference numeral 40 generally designates another form of logic circuit constructed according to the principles of this invention. The circuit 40 comprises a power source 41 identical to the source 11 of FIGURE 1, including a transformer 42 having a primary winding 43 and a secondary winding 44 which is connected in series with a diode 45 to output terminals 47 and 48. Power source output terminal 48 is connected to the emitters of a pair of NPN type transistors 51 and 52 having collectors connected through resistors 53 and 54 to the positive power source terminal 47.

The circuit 40 differs from that of FIGURE 1 in that the cross-connection resistors 25 and 26 are eliminated and instead a pair of biasing elements 55 and 56 are connected between the base electrodes of transistors 51 and 52 and the negative power source terminal 48. Elements 55 and 56 may preferably be in the form of diodes as illustrated, but resistors may be submitted therefor. A pair of signal input terminals 57 and 58 are connected to the base electrodes of transistors 51 and 52 while a pair of signal output terminals 59 and 60 are connected to the collectors of the transistors 51 and 52.

In the operation of the circuit 40 of FIGURE 3, an output signal is obtained in the presence of a power source signal, and if the input signal is reduced to zero or reversed in polarity in the presence of a power source signal, an output signal of zero or of reversed polarity is obtained accordingly, which is not true of the circuit 10 of FIGURE 1, where an output signal of one polarity is obtained after an input signal of one polarity is established and continues until the power source signal is terminated.

For example, assume that a power source signal is applied from terminals 47 and 48 having a wave form as indicated by reference numeral 61 in FIGURE 4A and which is "on" from a time $t_2$ to a time $t_5$, and assume that an input signal 62 is applied to terminals 57 and 58 which is "on" from a time $t_1$ to a time $t_4$, being slightly earlier than time $t_2$ and time $t_4$ being slightly earlier than time $t_5$. If input terminal 57 is positive when signal 62 is "on," the transistor 51 is rendered conductive at time $t_2$ while transistor 52 remains non-conductive, thereby placing output terminal 59 at a potential approaching that of the negative power source terminal 48 and thereby placing output terminal 60 at a potential approaching that of the positive power source terminal 47. At time $t_4$, when the input signal 62 is "off," neither transistor will conduct and the original condition is restored. There is thus developed at the output terminals 59 and 60 an output signal having a wave form as indicated by reference numeral 63 in FIGURE 4C.

As another example, assume that the same power source signal 61 is applied and assume that an input signal 64 is applied to terminals 57 and 58 which is "on" from a time $t_3$ to the time $t_4$, time $t_3$ being later than time $t_2$ and time $t_4$ being slightly earlier than time $t_5$. There is then developed across output terminals 59 and 60 an output signal having a wave form as indicated by reference numeral 65 in FIGURE 4E.

As a third example, assume that the same power source signal 61 is applied and assume that an input signal 66 is applied to terminals 57 and 58 which is "on" from time $t_3$ to a time $t_6$ which is later than the time $t_5$. An output signal as indicated by reference numeral 67 in FIGURE 4G is then developed which is "on" from time $t_3$ to the time $t_5$ when the power source signal terminates.

It is noted that the diodes 55 and 56 form a closed circuit with respect to the input terminals 57 and 58. For example, when the input signal is such as to render terminal 57 positive with respect to terminal 58, current flows from the terminal 57 through the base-emitter circuit of the transistor 51 and thence through the diode 56 to the terminal 58, thereby applying a negative signal to the base of the transistor 52 to hold the transistor 52 cut off. Accordingly, the circuit of FIGURE 3 can be operated with a power source signal of a constant level, which need not be interrupted.

Figure 5:
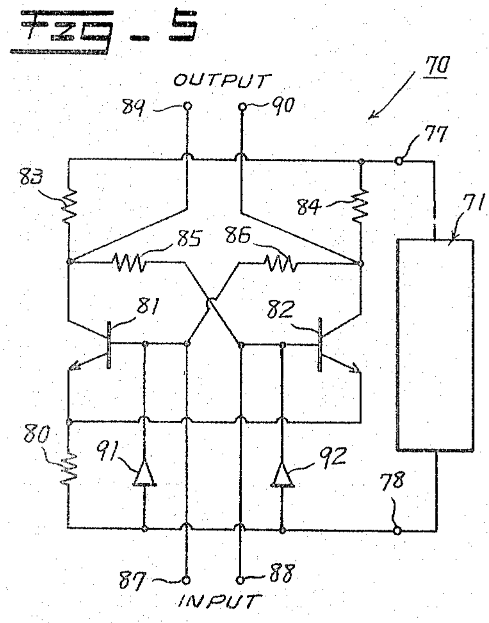
FIGURE 5 is a circuit diagram of another transistor logic circuit constructed according to this invention.

Referring to FIGURE 5, reference numeral 70 generally designates another logic circuit constructed according to this invention. The circuit 70 comprises a power source 71 which may be identical to the power source 11 of FIGURE 1, or the power source 41 of FIGURE 3, having positive and negative output terminals 77 and 78. Terminal 78 is connected through a resistor 80 to the emitters of NPN type transistors 81 and 82 having collectors connected through resistors 83 and 84 to the positive power source terminal 77 and also connected through resistors 85 and 86 to the base electrodes of transistors 82 and 81, respectively. Input terminals 87 and 88 are connected to the base electrodes of transistors 81 and 82, while output terminals 89 and 90 are connected to the collector electrodes of transistors 81 and 82.

An important feature of this circuit is in the connection of a pair of backward diodes 91 and 92 between the base electrodes of the transistors 81 and 82 and the negative power source terminal 78. Such backward diodes have a constant voltage characteristic when the reverse current flow is above a certain level, while having normal characteristics with respect to current flow in the forward direction. A backward diode, like a tunnel diode, is an element of a very high impurity density. The backward diode is an abrupt P–N junction type diode having effective impurity concentration of greater than $10^{18}$ impurities per cubic centimeter on both sides of the junction and in which the length of transition region is of the order of 200 Angstroms or less. It shows a substantially constant-voltage characteristic in both the positive and negative regions of voltage and current. Such diodes thereby serve to limit the voltages applied to the base-emitter circuits of the transistors 81 and 82 to permit operation of the transistors 81 and 82 in unsaturated conditions. The operation of the circuit 70 is otherwise the same as described above in connection with FIGURE 1.

Figure 6:
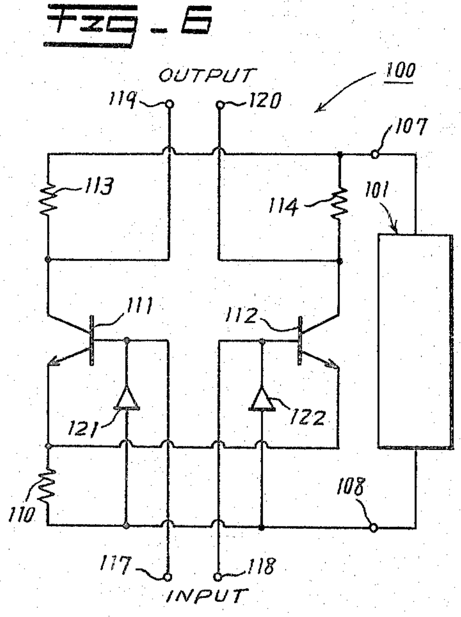
FIGURE 6 is a circuit diagram of still another transistor logic circuit constructed according to this invention.

Referring to FIGURE 6, reference numeral 100 generally designates another circuit constructed according to this invention, comprising a power source 101 which may be identical to the power source 11 of FIGURE 1 or the power source 41 of FIGURE 3, having positive and negative output terminals 107 and 108. Terminal 108 is connected through a resistor 110 to the emitters of NPN type resistors 111 and 112 having collectors connected through resistors 113 and 114 to the positive power source terminal 107. A pair of input terminals 117 and 118 are connected to the base electrodes of transistors 111 and 112, while a pair of output terminals 119 and 120 are connected to the collector electrodes of the transistors 111 and 112. In this circuit, a pair of backward diodes 121 and 122 are connected between the base electrodes of transistors 111 and 112 and the negative power source terminal 108. Such diodes operate in the same manner as the diodes 91 and 92 of FIGURE 5, to limit the voltages applied to the base-emitter circuits of the transistors 111 and 112. The operation of the circuit 100 is otherwise substantially identical to the operation of the circuit of FIGURE 3.

It is noted that in each of the circuits of FIGURES 1, 3, 5 and 6, constant voltage elements such as backward diodes can be connected between the collectors of the transistors and the positive power source terminal, to minimize variations in the output signal amplitudes and to compensate for variations in the voltage of the power source and variations in circuit constants.

Although NPN type transistors are shown in the illustrated circuits it will be apparent that the circuits can be formed with PNP type transistors.

It will be apparent that other modifications and variations may be effected without departing from the spirit and scope of the novel concepts of this invention.

We claim as our invention:

1. In a four terminal logic circuit, a pair of amplifier devices each including first, second and third electrodes with the impedance between said first and second electrodes being controlled by the magnitude of a signal applied between said third and first electrodes, a first input signal, means connecting said first electrodes to one side of said first input signal source, a pair of impedances connecting said second electrodes to the other side of said first input signal source, a second input signal source, means connected between said second input signal source and said amplifier devices for biasing each of said devices and defining a complete biasing path therefor including means for connecting one end of said second input signal source to one of said third electrodes and simultaneously connecting the other end of said second input signal source to the other of said third electrodes, and an output including a pair of output terminals each connected to a respective one of said second electrodes and providing an output voltage having a value proportional to the value of the voltage of said first input signal source and a polarity dependent upon the polarity of the voltage of said second input signal source.

2. In a four terminal logic circuit, a pair of amplifier devices each including first, second and third electrodes with the impedance between said first and second electrodes being controlled by the magnitude of a signal applied between said third and first electrodes, a first input signal source, means connecting said first electrodes to one side of said first input signal source, a pair of impedances connecting said second electrodes to the other side of said first input signal source, a second input signal source, means connected between said second input signal source and said amplifier devices for biasing each of said devices and defining a complete biasing path therefor including means for connecting one end of said second input signal source to one of said third electrodes and simultaneously connecting the other end of said second input signal source to the other of said third electrodes, and an output including a pair of output terminals each connected to a respective one of said second electrodes and providing an output voltage having a value proportional to the value of the voltage of said first input signal source and a polarity dependent upon the polarity of the voltage of said second input signal source, said first input signal source being arranged to develop said output voltage as an intermittent signal at said output terminals.

3. In a four terminal logic circuit, a pair of amplifier devices each including first, second and third electrodes with the impedance between said first and second electrodes being controlled by the magnitude of a signal applied between said third and first electrodes, a first input signal source, means connecting said first electrodes to one side of said first input signal source, a pair of impedances connecting said second electrodes to the other side of said first input signal source, a second input signal source, means connected between said second input signal source and said amplifier devices for biasing each of said devices including means connecting one end of said second input signal source to one of said third electrodes and simultaneously connecting the other end of said second input signal source to the other of said third electrodes, an output including a pair of output terminals each connected to a respective one of said second electrodes and providing an output voltage having a value proportional to the value of the voltage of said first input signal source and a polarity dependent upon the polarity of the voltage of said second input signal source, said biasing means including means for rendering one of said devices non-conductive when the other is conductive.

4. In a four terminal logic circuit, a pair of amplifier devices each including first, second and third electrodes with the impedance between said first and second electrodes being controlled by the magnitude of a signal applied between said third and first electrodes, a first input signal source, means connecting said first electrodes to one side of said first input signal source, a pair of impedances connecting said second electrodes to the other side of said first input signal source, a second input signal source, means connected between said second input signal source and said amplifier devices for biasing each of said devices including means connecting one end of said second input signal source to one of said third electrodes and simultaneously connecting the other end of said second input signal source to the other of said third electrodes, an output including a pair of output terminals each connected to a respective one of said second electrodes and providing an output voltage having a value proportional to the value of the voltage of said first input signal source and a polarity dependent upon the polarity of the voltage of said second input signal source, said biasing means including means for rendering one of said devices non-conductive when the other is conductive, said first input signal source being arranged to develop said output voltage as an intermittent signal at said output terminals.

5. In a four terminal logic circuit, a pair of amplifier devices each including first, second and third electrodes with the impedance between said first and second electrodes being controlled by the magnitude of a signal applied between said third and first electrodes, a first input signal source, means connecting said first electrodes to one side of said first input signal source, a pair of impedances connecting said second electrodes to the other side of said first input signal source, a second input signal source, means connected between said second input signal source and said amplifier devices for biasing each of said devices including means connecting one end of said second input signal source to one of said third electrodes and simultaneously connecting the other end of said second input signal source to the other of said third electrodes, an output including a pair of output terminals each connected to a respective one of said second electrodes and providing an output voltage having a value proportional to the value of the voltage of said first input signal source and a polarity dependent upon the polarity of the voltage of said second input signal source, said biasing means including a pair of impedance elements connected between said third and first electrodes of said amplifier devices for applying a signal to prevent conduction of one of said devices when the polarity of a voltage of said second input signal source is such as to render the other of said amplifier devices conductive.

6. In a four terminal logic circuit,
a pair of amplifier devices each including first, second and third electrodes with the impedance between said first and second electrodes being controlled by the magnitude of a signal applied between said third and first electrodes,
a first input signal source,
means connecting said first electrodes to one side of said first input signal source,
a pair of impedances connecting said second electrodes to the other side of said first input signal source,
a second input signal source, means connected between said second input signal source and said amplifier devices for biasing each of said devices including means connecting one end of said second input signal source to one of said third electrodes and simultaneously connecting the other end of said second input signal source to the other of said third electrodes,
an output including a pair of output terminals each connected to a respective one of said second electrodes and providing an output voltage having a value proportional to the value of the voltage of said first input signal source and a polarity dependent upon the polarity of the voltage of said second input signal source,
said biasing means including a pair of diodes connected between said third and first electrodes of said amplifier devices for applying a signal to prevent conduction of one of said devices when the polarity of a voltage of said second input signal source is such as to render the other of said devices conductive.

7. In a four terminal logic circuit,
a pair of amplifier devices each including first, second and third electrodes with the impedance between said first and second electrodes being controlled by the magnitude of a signal applied between said third and first electrodes,
a first input signal source,
means connecting said first electrodes to one side of said first input signal source,
a pair of impedances connecting said second electrodes to the other side of said first input signal source,
a second input signal source, means connected between said second input signal source and said amplifier devices for biasing each of said devices including means connecting one end of said second input signal source to one of said third electrodes and simultaneously connecting the other end of said second input signal source to the other of said third electrodes,
an output including a pair of output terminals each connected to a respective one of said second electrodes and providing an output voltage having a value proportional to the value of the voltage of said first input signal source and a polarity dependent upon the polarity of the voltage of said second input signal source,
and a pair of voltage limiting means connected between said third and first electrodes of said amplifier devices for limiting conduction of said amplifier devices.

8. In a four terminal logic circuit,
a pair of amplifier devices each including first, second and third electrodes with the impedance between said first and second electrodes being controlled by the magnitude of a signal applied between said third and first electrodes,
a first input signal source,
means connecting said first electrodes to one side of said first input signal source,
a pair of impedances connecting said second electrodes to the other side of said first input signal source,
a second input signal source, means connected between said second input signal source and said amplifier devices for biasing each of said devices including means connecting one end of said second input signal source to one of said third electrodes and simultaneously connecting the other end of said second input signal source to the other of said third electrodes,
an output including a pair of output terminals each connected to a respective one of said second electrodes and providing an output voltage having a value proportional to the value of the voltage of said first input signal source and a polarity dependent upon the polarity of the voltage of said second input signal source,
and a pair of backward diodes connected between said third and first electrodes of said amplifier devices for limiting conduction of said amplifier devices.

9. In a four terminal logic circuit,
a pair of transistors each having emitter, collector and base electrodes,
a first input signal source,
means connecting said emiter electrodes to one side of said first input signal source,
a pair of impedances connected between said collector electrodes and the other side of said first input signal source,
a second input signal source, means connected between said second input signal source and said transistors for biasing each of said transistors including means connecting one end of said second input signal source to one of said base electrodes and simultaneously connecting the other end of said second input signal source to the other of said base electrodes,
and an output including a pair of output terminals each connected to a respective one of said collector electrodes and providing an output voltage having a value proportional to the value of the voltage of said first input signal source and a polarity dependent upon the polarity of the voltage of said second input signal source.

10. In a four terminal logic circuit,
a pair of amplifier devices each including first, second and third electrodes with the impedance between said first and second electrodes being controlled by the magnitude of a signal applied between said third and first electrodes,
a first input signal source,
means connecting said first electrodes to one side of said first input signal source,
a pair of impedances connecting said second electrodes to the other side of said first input signal source,
a second input signal source, means connected between said second input signal source and said amplifier devices for biasing each of said devices including means connecting one end of said second input signal source to one of said third electrodes and simultaneously connecting the other end of said second input sisgnal source to the other of said third electrodes,
an output including a pair of output terminals each connected to a respective one of said second electrodes and providing an output voltage having a value proportional to the value of the voltage of said first input signal source and a polarity dependent upon the polarity of the voltage of said second input signal source,
said first input signal source comprising a transformer having primary and secondary windings,
and a diode connected in series with said secondary winding.

11. In a four terminal logic circuit,
a pair of amplifier devices each including first, second and third electrodes with the impedance between said first and second electrodes being controlled by the magnitude of a signal applied between said third and first electrodes,
a first input signal source, a common impedance connecting said first electrodes to one side of said first input signal source, a pair of impedances connecting said second electrodes to the other side of said first input signal source, a second input signal source, means connected between said second input signal source and said amplifier devices for biasing each of said devices including means connecting one end of said second input signal source to one of said third electrodes and simultaneously connecting the other end of said second input signal source to the other of said third electrodes, an output including a pair of output terminals each connected to a respective one of said second electrodes and providing an output voltage having a value proportional to the value of the voltage of said first input signal source and a polarity dependent upon the polarity of the voltage of said second input signal source, and a pair of voltage limiting means connected between said third electrodes and said one side of said first input signal source for limiting conduction of said amplifier devices.

References Cited by the Examiner

UNITED STATES PATENTS

| | | | |
|---|---|---|---|
| 2,356,589 | 8/1944 | Hessenberg | 328—81 X |
| 2,622,212 | 12/1952 | Anderson et al. | 307—88.5 |
| 2,898,479 | 8/1959 | McElroy | 307—88.5 |
| 2,920,215 | 1/1960 | Lo | 307—88.5 |
| 2,956,175 | 10/1960 | Bothwell | 307—88.5 |
| 2,997,602 | 8/1961 | Eachus | 307—88.5 |
| 2,979,625 | 4/1961 | Bothwell et al. | 307—88.5 |
| 2,995,664 | 8/1961 | Deuitch | 307—88.5 |
| 3,017,523 | 1/1962 | Harris | 307—88.5 |
| 3,018,387 | 1/1962 | Beck | 307—88.5 |
| 3,040,187 | 1/1962 | Dobbie | 307—88.5 |
| 3,069,568 | 12/1962 | Day | 307—88.5 |
| 3,100,266 | 8/1963 | McCabe | 307—88.5 |
| 3,128,412 | 4/1964 | Abromaitis | 307—88.5 |
| 3,170,125 | 2/1965 | Thompson | 330—30 X |
| 3,171,982 | 3/1965 | Ruhland | 307—88.5 |
| 3,187,196 | 6/1965 | Corbell et al. | 307—88.5 |

ARTHUR GAUSS, *Primary Examiner.*

J. JORDAN, *Assistant Examiner.*